Jan. 9, 1940.      R. J. WILKIE      2,186,890
SECTIONAL ROLL
Filed May 31, 1938
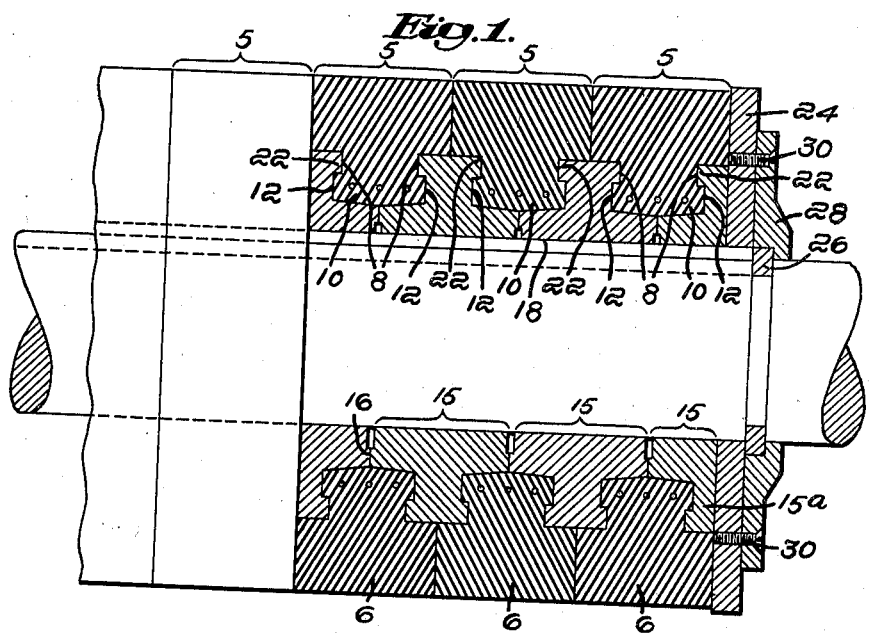
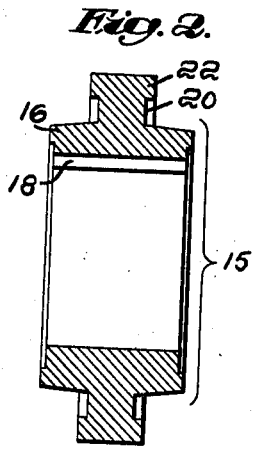
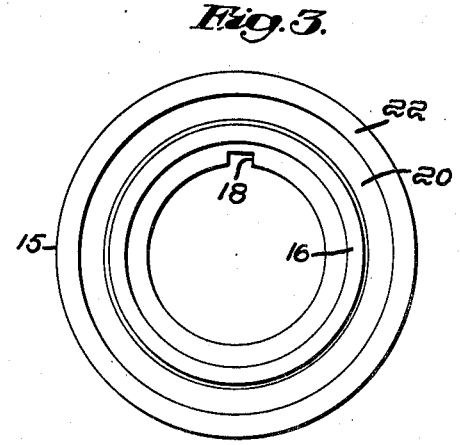
Inventor:
Robert J. Wilkie,
by Emery, Booth, Townsend, Miller & Weidner
Attys.

Patented Jan. 9, 1940

2,186,890

UNITED STATES PATENT OFFICE 2,186,890

SECTIONAL ROLL

Robert J. Wilkie, Newton, Mass., assignor to Stowe-Woodward, Inc., Newton Upper Falls, Mass., a corporation of Massachusetts Application May 31, 1938, Serial No. 210,851

2 Claims. (Cl. 68—277)

This invention relates to sectional rolls for use in wringing machines and the like, such, for example, as the roll disclosed in the patent to Crysler and Wilkie 2,107,471, and the object is to provide an improved construction for retaining in position the rubber or equivalent sections of such a roll, the construction having various advantages which will appear to those skilled in the art as the description proceeds.

My invention will be well understood by reference to the following description of an illustrative embodiment thereof shown by way of example in the accompanying drawing, wherein:

Fig. 1 is an elevation partly in section showing a portion of the complete assembled roll;

Fig. 2 is a diametral section through one of the holding elements; and

Fig. 3 is a side elevation thereof.

Referring to the drawing, the roll there shown is made of a number of ring-like sections 5 of rubber or the like each having an outer portion 6 of generally rectangular section, which portions are closely pressed together in side by side relation, an inner retaining portion comprising a restricted neck 8 and a relatively enlarged base portion 10 defined by the laterally projecting flanges 12, these retaining portions being engaged by suitable holding members 15 to retain the sections 5 in position on the shaft 14. The sections may be of any suitable construction, as, for example, that more fully described in the patent just referred to.

To retain the rubber sections 5 on the shaft 14 I provide single unitary metallic holding members 15 alternating between the adjacent sections, and these members may each comprise a hub or sleeve portion 16 having an axial length equivalent or substantially equal to the effective axial width of the working face of each of the rubber sections 5. These hub portions 16 are adapted to be strung on the shaft and are provided with suitable keyways 18 whereby they are interlocked with the shaft to rotate therewith. Rising radially from the hub 16, and herein centrally thereof, is an annular web 20 provided with overhanging flanges 22 projecting therefrom in opposite directions.

When the several holding members and rubber sections are assembled in alternation on the shaft, the flanges 12 on each of the rubber sections 5 are received beneath the overhanging flanges 22 of successive holding members 15 and held thereby. Usually terminal members 15a are provided, each being in effect a half of one of the sections 15, as will be well understood. The rubber sections 5 and the holding members 15 are subjected to a heavy axial pressure of several tons, for example, ten to twenty tons, and then locked in place on the shaft. The device here shown to hold the sections and holding members in place may be used at either or both ends of the assembly and consists of an annular plate or end flange 24 which, having been axially placed in the proper position, is held in position by a split or two-part locking ring 26 seated in an annular circumferential groove in the shaft 14. An annular plate 28 having a recessed portion to fit the locking ring holds the locking ring in place, the plate itself being held to the end flange 24 by screws 30. The sections 5 are firmly gripped and held tightly together between adjacent holding elements 15 with the hub portions 16 of the latter almost or barely touching each other beneath the centers of the sections 5 when the latter have been suitably compressed for service, as seen in Fig. 1.

By the construction of holding sections 15 here described a long bearing for each on the shaft is provided and a firm driving engagement therewith. The possibility of any of the sections tipping to one side or the other and any consequent disarrangement of the bearing surface of the roll is minimized. The assembling of the roll is also facilitated since the hubs slide evenly with little tendency to bind on the shaft and the necessary axial pressure is readily applied and effectively transmitted to the rubber sections 5. During use the shifting of the holding members is considerably reduced due to their long driving connection with the shaft, and wear on the shaft which might necessitate turning it down and replacement of the holding devices when it became necessary to replace the rubber sections is avoided.

In a construction such as is shown in the prior patent referred to, if any liquids find their way between the abutting faces of the rubber sections, a direct passage in a radial plane between the adjacent holding elements to the shaft is possible. Any such seepage is likely to cause the shaft to rust and make the holding members bind thereon. In the construction herein shown it is clear that any liquid entering between adjacent sections 5 before reaching the shaft must find its way through the rubber-to-metal joint, around the flange 22 to the surface of web 20 and along the sleeve portion 16, herein to the central plane of the rubber section 5.

I use the word "rubber" to include equivalents such as various mixtures and compounds of rubber, with or without such materials as fiber, as long as such equivalents meet the requirements of a roll of the general character described.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A sectional roll comprising a central shaft, a series of holding members strung on the shaft, each (other than terminal members at the ends of the assembly) comprising a central sleeve or hub having provision for engaging it with the shaft to turn therewith and a single radial annulus rising from the hub having overhanging, oppositely directed flanges, and ring-like rubber sections alternating with the holding members, said sections having outer portions in side by side contact and inner retaining portions comprising a reduced neck and an enlarged base each fitting beneath the adjacent flanges of two successive holding members and resting on the hub portions, the latter in each integral member being of an axial length corresponding to the exterior axial width of the sections, the sections being retained by pressure axially applied to the series of holding members.

2. A sectional roll comprising a central shaft, a series of holding members strung on the shaft, each (other than terminal members at the ends of the assembly) comprising a central sleeve or hub having provision for engaging it with the shaft to turn therewith and a single radial annulus rising substantially centrally from the hub having overhanging, oppositely directed flanges, and ring-like rubber sections alternating with the holding members, said sections having outer portions in side by side contact and inner retaining portions comprising a reduced neck and an enlarged base each fitting beneath the adjacent flanges of two successive holding members and resting on the adjacent hub portions of said successive members, the hub portion of each member being of an axial width corresponding to the exterior axial width of a section, the sections being retained by pressure axially applied to the series of holding members.

ROBERT J. WILKIE.